(12) United States Patent
Portney

(10) Patent No.: US 8,128,222 B2
(45) Date of Patent: Mar. 6, 2012

(54) MULTIFOCAL DIFFRACTIVE CONTACT LENS WITH BI-SIGN SURFACE SHAPE

(76) Inventor: Valdemar Portney, Newport Coast, CA (US)

( * ) Notice: Subject to any disclaimer, the term of this patent is extended or adjusted under 35 U.S.C. 154(b) by 358 days.

(21) Appl. No.: 12/510,172

(22) Filed: Jul. 27, 2009

(65) Prior Publication Data

US 2011/0019148 A1    Jan. 27, 2011

(51) Int. Cl.
G02C 7/04 (2006.01)
(52) U.S. Cl. .................... 351/160 R; 351/159
(58) Field of Classification Search ............ 351/159, 351/160 H, 160 R, 161–162
See application file for complete search history.

(56) References Cited

U.S. PATENT DOCUMENTS

| 4,210,391 A | 7/1980 | Cohen |
| 4,256,369 A * | 3/1981 | Wichterle ............. 351/160 H |
| 4,338,005 A | 7/1982 | Cohen |
| 4,340,283 A | 7/1982 | Cohen |
| 4,637,697 A | 1/1987 | Freeman |
| 4,641,934 A * | 2/1987 | Freeman ............... 351/159 |
| 4,642,112 A | 2/1987 | Freeman |
| 4,655,565 A | 4/1987 | Freeman |
| 4,881,805 A | 11/1989 | Cohen |
| 4,995,714 A | 2/1991 | Cohen |
| 4,995,715 A | 2/1991 | Cohen |
| 5,054,905 A | 10/1991 | Cohen |
| 5,056,908 A | 10/1991 | Cohen |
| 5,117,306 A | 5/1992 | Cohen |
| 5,120,120 A | 6/1992 | Cohen |
| 5,121,979 A | 6/1992 | Cohen |
| 5,121,980 A | 6/1992 | Cohen |
| 5,144,483 A | 9/1992 | Cohen |
| 5,296,881 A | 3/1994 | Freeman |
| 5,748,282 A | 5/1998 | Freeman |
| 2008/0033546 A1* | 2/2008 | Liang ..................... 623/5.11 |

* cited by examiner

Primary Examiner — James Greece
(74) Attorney, Agent, or Firm — Walter A. Hackler

(57) ABSTRACT

A contact lens for placing over the eye is described. The lens has at least one non-spherical shape surface configured with bi-sign profile to maintain lens optical advantage as compared with equivalent far power spherical lens within common clinical condition of lens movement over the cornea of the eye.

7 Claims, 4 Drawing Sheets

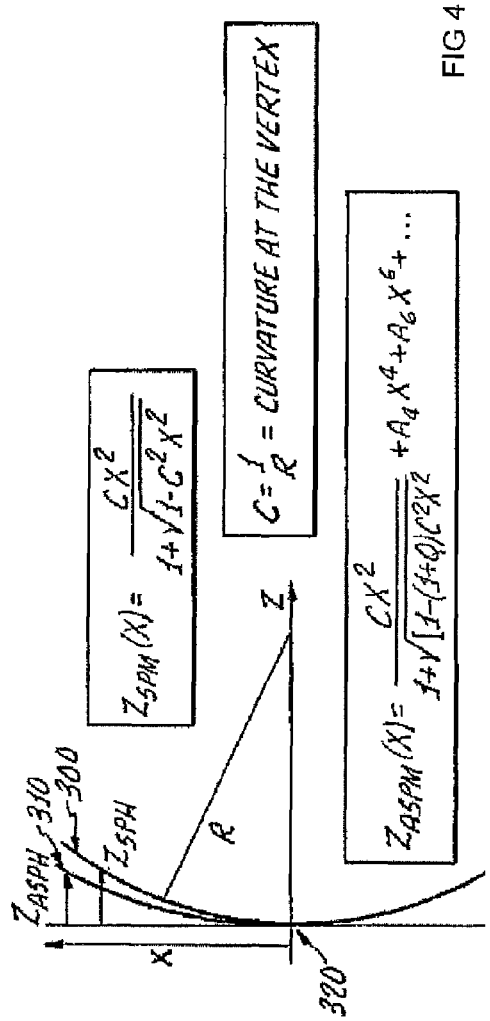
FIG 4
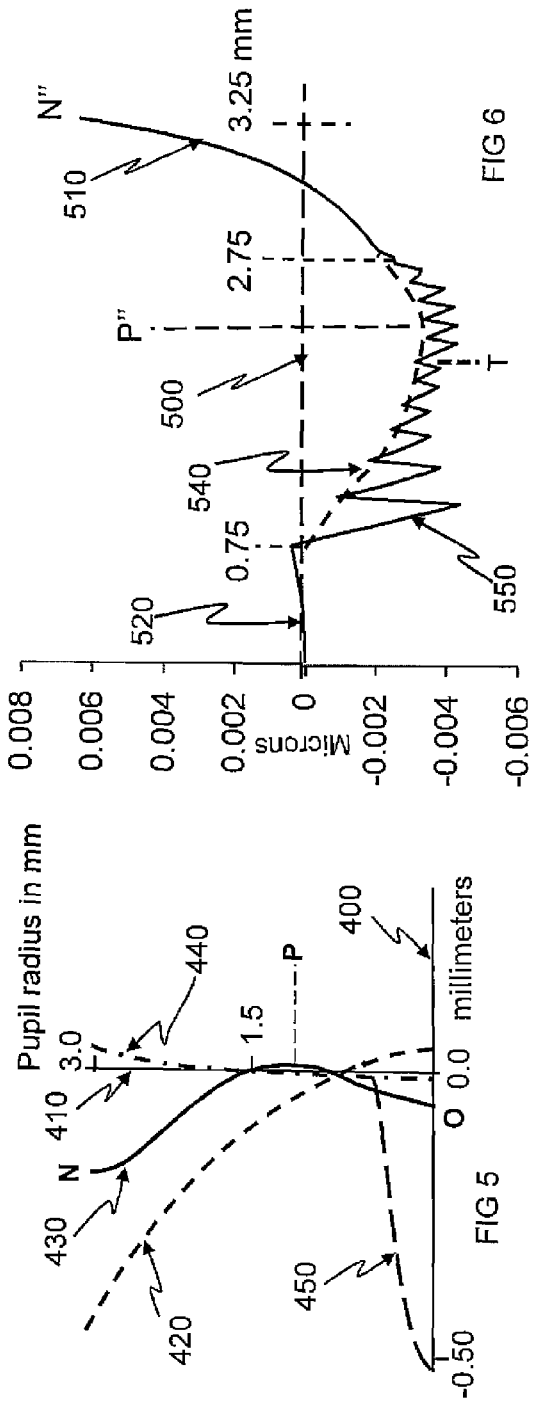
FIG 6
FIG 5

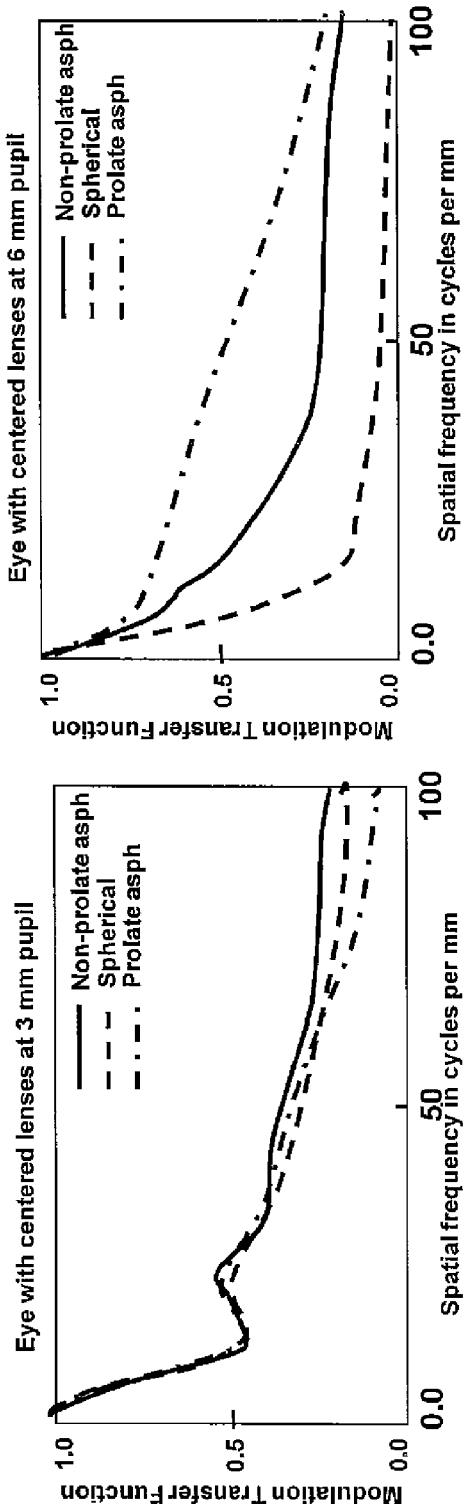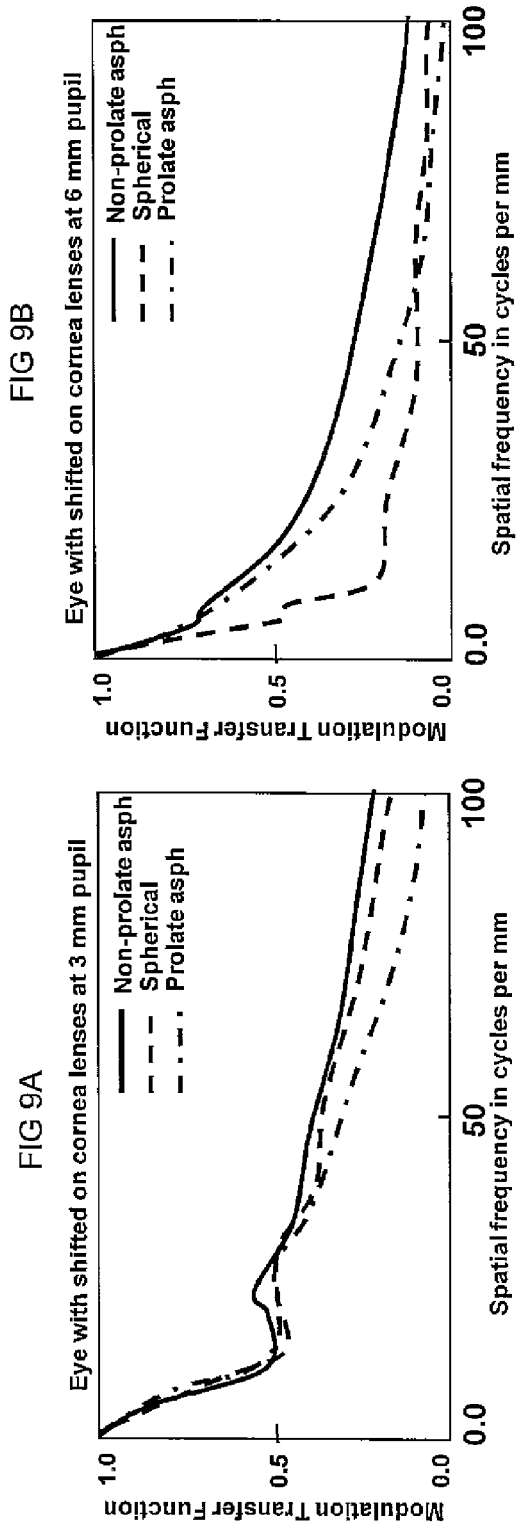

MULTIFOCAL DIFFRACTIVE CONTACT LENS WITH BI-SIGN SURFACE SHAPE

FIELD OF THE INVENTION

This invention relates to multifocal diffractive contact lens and more specifically to an improved multifocal diffractive contact lens with lens surface shaped as bi-sign non-spherical surface of distance power.

BACKGROUND OF THE INVENTION

A contact lens consists of front and back surface with the back surface is placed against the cornea of the eye. As a person develops deficiency to accommodate from far to near objects, multifocal contact lens can be used to compensate for the lack of the accommodation. There are simultaneous vision contact lenses which form images from distance and near objects simultaneously at the retina to allowing the person to rely on the image that is in focus and ignore another which is out of focus; and translating contact lens that are designed to move up and down on the cornea to expose lens portions either for far or near viewing.

This invention primarily addresses simultaneous vision contact lenses and more specifically diffractive contact lens where diffraction grating placed on one of the surfaces to form different orders that associate with either far and near foci. Cohen and Freeman are the principal inventors of ophthalmic multifocal diffractive optic and particularly multifocal contact lens that utilizes several diffractive orders to form image from the objects at different distances. The Cohen patents: U.S. Pat. Nos. 4,210,391; 4,338,005; 4,340,283; 4,881,805; 4,995,714; 4,995,715; 5,054,905; 5,056,908; 5,117,306; 5,120,120; 5,121,979; 5,121,980 and 5,144,483. The Freeman patents: U.S. Pat. Nos. 4,637,697; 4,641,934; 4,642,112; 4,655,565, 5,296,881 and 5,748,282 where the U.S. Pat. No. 4,637,697 references to the blaze as well as step-shapes (binary) diffractive surface.

A multifocal diffractive optic may be constructed by blazed shaped grooves that are placed on the back surface of the contact lens or dual zone groove described by Fiola and Pingitzer in the U.S. Pat. No. 6,120,148 that can be placed on the front surface of the lens due to smoother surface transition between the grooves. Regardless of particular multifocal surface grooves configuration, the grooves are structured to direct substantial portions of light between zero order for far and first-order for near foci forming diffractive bifocal optic.

The average pupil size of the eye at normal photopic lighting condition is around 3 mm diameter and increases or dilates to about 6 mm diameter al low light condition called mesopic condition. Size of dilated pupil depends upon the eye and usually reduces with age. Changes in pupil size contribute to imaging quality of the eye—the image quality usually reduces with pupil dilation. In addition to pupil size, the lens movement over the cornea results in lens decentration (radial translation) and tilt (axial rotation), jointly called lens shift, may significantly contribute to the image quality particularly in multifocal optic. Contact lens must move on the cornea for corneal health and this is the reason to use the term lens "shift" instead of "misalignment" in referencing to contact lens movement over the cornea. The contact lens shift magnitudes can be found in paper by G. Young, et al. "Comparative Performance of Disposable Soft Contact Lenses", Contact Lens and Ant Eye; 1997: 20; pp 13-21. In the majority of conditions the lens shifting over the cornea falls within about 0.6 mm decentration. The corresponding lens axial rotation or tilt due to lens movement over the curved corneal surface is about 4.4° for an average corneal radial shape.

There are overlapping terms such as "Base surface" used for back surface of a contact lens and in conjunction with diffractive surface as a imaginable surface responsible for far focus over which the diffraction grooves are placed. In order to avoid confusion, the term "Base surface" is only applied to the optical surface that incorporates multifocal diffraction zone. Thus, Base surface in this disclosure may be a front surface of the contact lens or back surface of the contact lens. The sides of the contact lens surfaces will be distinguished by referencing to as "front surface" or "back surface".

Base surface together with the opposite refractive surface of the lens responsible for the direction of zero order diffraction used for far vision. Base surface shape together with the shape of the opposite refractive surface are also responsible for the amount of aberrations at far vision. The diffraction surface may occupy the full optical zone of the contact lens or only portion of the zone. In later case, the shape of the surface outside of the diffraction portion also contributes to a position of far focus and aberrations at far vision. In order to avoid repetition in distinguishing between diffraction zone occupying full lens optical zone or only partial optical zone, the total surface within the lens optical zone that is responsible for far focus position will be referenced to as Base surface. Commonly, the Base surface of the contact lens is of spherical shape.

The final quality of the far image depends upon aberrations of the eye with the contact lens on it. Within some range of aberrations a surface is still considered to be monofocal or single focus surface. In terms of diopters, a range of aberrations that produces foci spread along the optical axis of up to about 0.5 D (about 0.25 mm range) at nominal 3 mm pupil is still considered single focus and the corresponding surface is single focus surface. If the range of aberrations produces foci spread more that about 0.5 D for 3 mm pupil, the corresponding contact lens is called "Aspheric contact lens". There is historical difference in terms "aspheric" applied to contact lenses and intraocular lenses—"aspheric contact lens" means multifocal contact lens that expends foci along the optical axis beyond normal aberrations of single focus optic; "aspheric intraocular lens" means single focus lens with a surface shaped to reduce the aberrations from the spherical intraocular lens of the same power. In order to avoid confusion, the terms "aspheric" and "aspherization" are not used in this disclosure and more general terms "non-spherical" and "reshaping" are applied instead.

Even in a perfectly centered position of spherical contact lens there is still spherical aberration which might be substantial at large pupil sizes at mesopic condition. The reshaping of one of spherical surfaces of the lens eliminates spherical aberrations occurred in the lens centered position. This can be accomplished by progressively increasing radius for front surface or progressively reducing radius for back surface of the lens. The difference arises because front surface is convex surface, i.e. positive power, and back surface is concave surface, i.e. negative power. Progressively increasing or reducing radius of the surface within the optical zone is characteristic of so called prolate shaped surface.

Nevertheless, the clinical testing indicates that image quality doesn't practically improves with lens surface reshaping that reduces eye spherical aberration (SA) due to additional aberration such as coma resulted with contact lens movement over the corneal surface, see paper by H. H. Dietze and M. J. Cox; "Correcting ocular spherical aberration with soft contact lenses", J. Opt. Soc. Am. A: 21: 2004, pp 473-485. The paper concluded that "Physiological corneal tilt and/or imperfect lens centration can produce levels of coma-like aberration, reducing the visual benefits of correcting SA with contact lenses using aspheric surfaces". Note, "aspheric surface" terminology used in the paper referred to custom made monofocal non-spherical surface to eliminate spherical aberration, not a multifocal surface where the corresponding terms commonly used in case of contact lenses. The custom surface in the above paper was ellipsoidal shape surface, i.e. prolate non-spherical shape.

Thus, there is the need for a better solution for optic that would maintain the imaging superiority over the lenses that incorporate spherical surface for far vision either in monofocal or multifocal diffractive lens of the equivalent far power within the range of clinically common contact lens movement over the corneal surface.

In order to explain the invention the following background information is also provided.

It has been a common approach to describe aspheric lens aberrations in terms of wavefront aberrations. Wavefront Error can be represented mathematically as Zernike Polynomial Decomposition $W(\rho,\theta)=\Sigma a_{n,m} Z_n^m(\rho,\theta)$, where $Z_n^m(\rho,\theta)$ are Zernike radial polynomials of n-order and m-frequency and $a_{n,m}$ are Zernike Coefficients as the measure of wavefront aberrations and commonly called "aberrations". In this Zernike Polynomial Decomposition, $2^{nd}$ order aberrations are called Low Order Aberrations (LOA) which includes defocus and astigmatism, and aberrations above $2^{nd}$ order are called High Order Aberrations (HOA). They include spherical aberration, coma, trefold, etc.

There is certain misconception about wavefront aberrations as applied to ocular imaging because they are mathematical abstraction and do not directly represent light distribution at the retina in a form of spot diagram. Their impact on the image quality can only be measured through their relationship with ray aberrations which directly relate to the light distribution at the retinal image.

The key benefit of wavefront aberrations lies in the ability to assess a relative contribution on the optical quality by different wavefront aberrations. This is because Zernike radial polynomials are normalized orthogonal set of functions and their coefficients which are called "wavefront aberration", can be easily combined into groups by Root Mean Square (RMS) per formula $RMS^2=\Sigma(a_{n,m})^2$. For instance, one can combine Low Order Aberration into $RMS_{LOA}$ and high order aberrations into $RMS_{HOA}$ in order to assess their relative contributions to the optical quality. Low order wavefront aberrations are related to ray aberrations such as defocus and astigmatism jointly called refractive error which is correctable by conventional optical aids such as glasses, contact lenses and IOLs, but high order aberrations generally are not.

In order to understand a relationship between the aberrations and light distribution at the retina, optically called spot diagram, one has to include ray aberrations. The relationship between wavefront and ray aberrations can be found for instance in James C Wyant, "Basic Wavefront Aberration Theory for Optical Metrology", Applied Optics and Optical Engineering, Vol. XI, Chapter 1, 1992.

Wavefront error is usually defined at the Entrance Pupil of the optical system as W(x,y), where x, y are pupil Cartesian coordinates. Assuming the wavefront error W(x,y) is relatively small and the angle between the reference and aberrated wavefronts is also small, FIG. 2. This angle $\alpha_x$ is called angular aberration of the ray and defined by the first derivative of the wavefront error $$\alpha_x = \frac{-\partial W(x,y)}{n\partial x}.$$

The corresponding transverse aberration $T_x$ and longitudinal aberration L of the ray are also defined by the first derivative of the wavefront aberration:

$$T_x = R_w \alpha_x = -R_w \frac{\partial W(x,y)}{n\partial x};$$

the same for $T_y$; as transverse ray aberrations along x and y-coordinates at the pupil. The ratio of the longitudinal ray aberration and transverse ray aberration $$\frac{L}{T_x} \approx \frac{R_w}{(x-T_x)} \approx \frac{R_w}{x} \text{ and } L \approx \frac{R_w^2}{x} \frac{\partial W(x,y)}{n\partial x}.$$

It is resulted in the difference between the distances to the aberrated ray focus and perfect ray focus where foci are defined as the points of intersections of these rays with the optical axis.

Thus, wavefront aberrations have abstract mathematical meaning of the coefficients in Zernike Polynomial Decomposition but at certain low enough orders of the wavefront aberrations such defocus, astigmatism, spherical aberration and coma, they correlate per above equations with the ray aberrations under the same names. Ray aberrations have physical meaning of light energy travel and can be geometrically interpreted by light rays distribution at the retina. This allows to describing the invention in geometrical terms which are more perceptible than abstract mathematical terms of wavefront aberrations.

In summary, there are two measures of vision quality: (1) pupil based which are wavefront related such as wavefront aberrations and RMS because wavefront is defined at the pupil plane of the eye, and (2) image plane based such as PSF Point Spread Function), Strehl Ratio and MTF related which are derived from the spot diagram at the image plane, i.e. an image of the point object at the retina. Aberrometry used for measuring eye aberrations directly measures spot diagram and derives all other measures from it.

Pupil based measures are in good correlation with vision quality for 3 mm pupil and smaller because the aberrations are only small fraction of the wavelength. At this condition of the nominal eye is almost diffractive limited system and its Strehl Raito is 0.8 or higher. At this condition there is a linear relationship between Strehl Ratio and ($RMS^2$), i.e. pupil based measure lineally relates to pupil based measure and one can use either one for image quality analysis.

It has been shown that for larger pupils with large aberrations, pupil based measures are in poor correlation with vision quality and image plane based measures are much better to use in these conditions. At very large aberrations, spot diagram size becomes a dominant factor. Thus, it is more appropriate to utilize spot diagram and corresponding ray aberrations for image quality analysis at large pupil and lens misalignment where the aberrations are significant either in monofocal optic and particularly multifocal optic.

The simplest ray aberration to interpret is longitudinal ray aberration as being one-dimensional characteristic as the transverse (tangential) ray aberration is defined by two-dimensional characteristic. For optically centered system, longitudinal ray aberration is also called longitudinal spherical aberration or LSA. One can divide the entrance pupil or lens surface along, say x-meridian, into the regions. Each region can be characterized by its own longitudinal spherical aberration and the total spot diagram can be analyzed as a combination of spot diagrams from the regions. Below we will use ray aberrations and specifically longitudinal ray aberration for describing the invention.

SUMMARY OF THE INVENTION

A lens in accordance with this invention consists of front and back optical surfaces. In contact lenses "optical zone" of the lens is responsible for imaging. In this disclosure, a reference to "lens surface" means surface within the lens optical zone. At least one of the surfaces has at least two regions of different signs of longitudinal ray aberrations.

Image at the retina is represented by a spot diagram and directly characterized by transverse ray aberrations. Due to more complex description of the transverse ray aberration which involves 2-dimensional characterization, it is more illustrative to describe the invention in terms of longitudinal ray aberration which involves 1-dimensional characterization. Optical design programs such as Zemax® Optical Software incorporates graphical representation of longitudinal spherical aberration (LSA) and used for bi-sign shape surface explanation.

The invention involves the option that longitudinal ray aberration with one sign dominates at normal photopic condition of medium pupil size of about 3 mm at which the best focus position is defined, and longitudinal ray aberrations of the opposite sign contribute with the pupil dilation from about 3 to about 6 mm at mesopic condition. This is accomplished by the convex surface being flatter the spherical surface of equivalent power up to about 3 mm diameter and then steeper the spherical surface beyond about 3 mm diameter, i.e. the surface shape is bi-sign shape design. In case of concave surface, it is visa versa, steeper for up to about 3 mm diameter and flatter beyond it. As a result, these combination of surface regions creates a compensatory effect on the spot diagram by different signs of the longitudinal ray aberrations from different surface regions at large pupils as light rays distribute in front and behind the best image position defined at about 3 mm pupil. This occurred in lens centered position but more importantly, in lens shifted position where comatic aberration from different lens regions is also compensated due to different signs of ray aberrations.

Generally, one region may be the region of zero longitudinal ray aberration to accomplish at least some benefits.

The unexpected outcome of the invention is that if longitudinal ray aberrations of different signs are involved with pupil dilation above about 3 mm, far image quality may be improved over the equivalent power spherical lens even for clinically common range of lens movement over the cornea. This is particularly important in case of multifocal diffractive optic where the image quality at far is inherently reduced due to the presence of near image. Most complains on image contrast with multifocal optic occurs at large pupils likely due to increase in aberrations at such condition. Improvement in image contrast at large pupil for multifocal contact lens is extremely important in making it acceptable for contact lens wearers.

BRIEF DESCRIPTION OF THE DRAWINGS

The advantages and features of the present invention will be better understood by the following description when considered in conjunction with the accompanying drawings in which:

FIG. 4 provides description of spherical and non-spherical surfaces

FIG. 5 demonstrates longitudinal aberrations of the eye with spherical, prolate and bi-sign lens shapes.

FIG. 6 demonstrates a profile of one of the bi-sign shapes of the Base surface of multifocal diffractive surfaces of the contact lens as deviation from Base surface of the spherical shape of the equivalent far power.

FIGS. 9A, 9B, 9C and 9D are examples of Far vision Modulation Transfer Functions (MTFs) of the eye with spherical, prolate and bi-sign multifocal diffractive designs at centered lens position and lens shift over the cornea at 3 and 6 mm pupil diameters.

DETAILED DESCRIPTION

Figure 1:
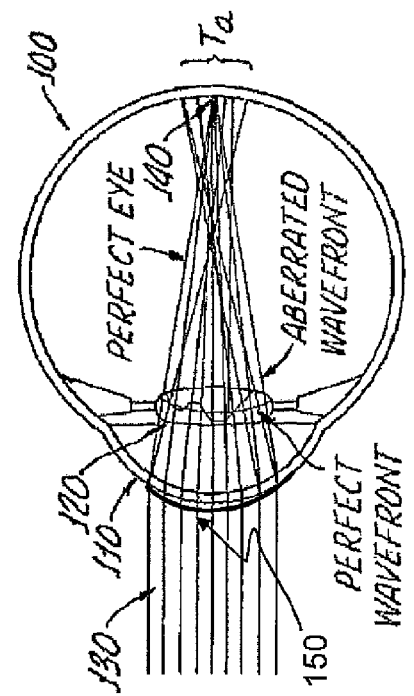
FIG. 1 illustrates the schematic eye with contact lens shown light beam passing through it and creating aberrated wavefront superimposed over the perfect wavefront.

FIG. 1 illustrates the schematic eye 100 with a crystalline lens 120 inside the eye. The light beam 130 from distant point-object passes though the contact lens 150, cornea 110 and crystalline lens 120 to form an image at the back of the eye. Contact lens can be made of different materials such gas-permeable materials, HEMA, silicone, etc. so the optical zone of the lens it can be soft or hard.

In case of a perfect optical system the perfect spherical wavefront is formed resulted in a single point focus 140. Commonly, the wavefront is aberrated and the resulted image is spread out within the range $T_a$ forming larger spot diagram thus reducing the image quality of the point-object. The spread of the light can be directly described by transverse ray aberrations of the eye.

Figure 2:
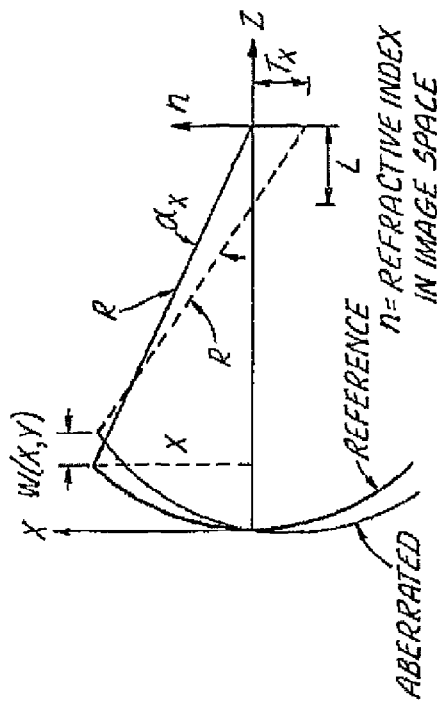
FIG. 2 illustrates aberrated wavefront and perfect wavefront and how it correlates with the ray aberrations

FIG. 2 illustrates aberrated wavefront and perfect wavefront and how it corresponds to ray aberrations. Perfect wavefront has spherical shape of radius R. The aberrated wavefront has wavefront errors W(x,y) which results in transverse aberration $T_x$ and longitudinal aberration L in terms of ray aberrations. Angle $\alpha_x$ is called angular aberration of the ray and defined by the first derivative of the wavefront error W(x,y). The mathematical relationship was introduced in the Background section above in case of a relatively small magnitude of the aberrations. For instance, longitudinal ray aberration is proportional to the first derivative of the wavefront error:

$$L \sim -\frac{\partial W(x, y)}{\partial x}.$$

Utilizing polar coordinates for wavefront error and Zernike Polynomial Decomposition $W(\rho,\theta)=\Sigma a_{n,m}Z_n^m(\rho,\theta)$, one can determine the relationship between longitudinal ray aberration and set of wavefront aberrations:

$$L \sim -\sum a_{n,m}\frac{\partial Z_n^m(\rho, \theta)}{\partial \rho} \quad \text{Eq. 1}$$

In the centered optical system all aberrations depending upon the θ-coordinate, so called non-symmetrical aberrations, are zero but with a misalignment these aberrations contribute to the image quality.

Figure 3:
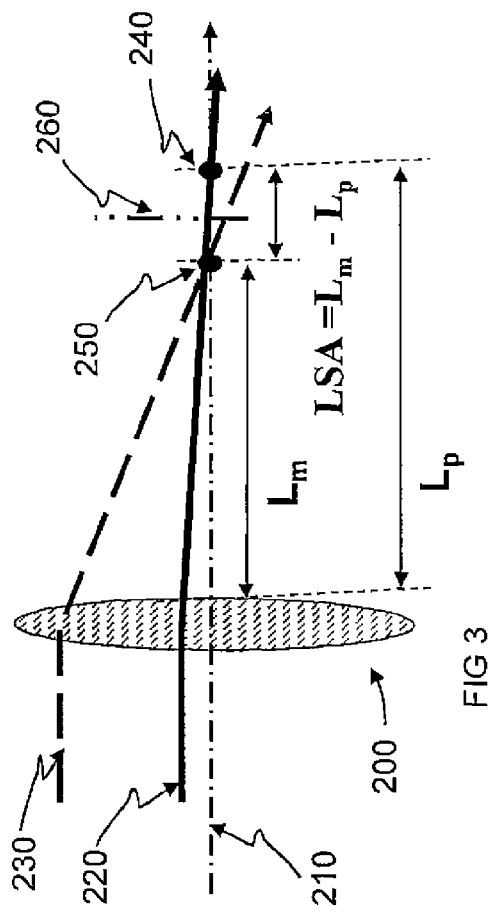
FIG. 3 illustrates lens manifesting longitudinal ray aberration in the case of centered optic system called longitudinal spherical aberration.

FIG. 3 illustrates lens manifesting longitudinal ray aberration in the case of centered spherical optic system 200 over the optical axis 210. More central ray 220 has focal point 240 and more peripheral ray 230 has focal point 250. This is a common manifestation of the foci by a positive spherical lens. Commonly, more central ray manifests minimum aberration and corresponds to the perfect wavefront. As a result, the difference between focal points 250 and 240 represents longitudinal ray aberration. In case of the central ray being paraxial ray and peripheral ray being marginal the corresponding longitudinal ray aberration is called longitudinal spherical aberration, LSA. In this invention the definition of the LSA has been expended to allow characterize individual surface region in terms of LSA defined as a difference in longitudinal aberration of the rays at the edges of the region in lens centered position.

The best focus position is close to the center of the LSA and shown by 260 and the distance to 240 represents defocus in terms of ray aberration. The figure demonstrates that both longitudinal spherical aberration and defocus varies with the aperture. All other aberrations are zero in this centered lens condition. With the lens misalignment other aberrations become non-zero and defocus takes a more complex dependence upon the set of aberrations.

FIG. 4 graphs spherical 300 and non-spherical 310 surfaces with the corresponding mathematical descriptions. Both surfaces have the same radial magnitude at the apex or vertex 320. As shown, the surface of the non-spherical surface 310 flattens from the corresponding spherical surface 300 with the distance to the surface apex x.

FIG. 5 demonstrates longitudinal ray aberrations (LSA) at far of multifocal diffractive lenses with spherical lens Base surface, 420, prolate shape Base surface lens to correct for spherical aberration at 6 mm pupil, 440, and bi-sign Base surface optimized for contact lens shift over the cornea by 0.6 mm decentration and 4.4 degrees tilt, 430. The graphs are drawn in relationship to the optical axis 400 and pupil's radial distance to the optical axis, 410. In this example the Base surface was used for lens shape modification to influence LSA. Similar outcome can be achieved by shaping the opposite refraction surface, in this particular example, front surface of the contact lens.

The designs analyzed here as an example includes aspherization in multifocal sense of the central zone within 1.5 mm diameter, 450, of the front surface in order to expand the multifocal designs to include intermediate foci the concept introduced by Portney in U.S. Pat. No. 7,073,906. The surface shape within 1.5 mm diameters of the front surface of the contact lens of 0.0 D and 2 D Add is defined by the Table 1 for Polymacon material of the contact lens. The aspherization can be also included at the center of the opposite base surface.

TABLE 1

| Parameters | Region within 1.13 mm dia. | Region within 1.13 and 1.5 mm dia. |
|---|---|---|
| Front spherical vertex radius R (mm) | 8.3 | 8.45 |
| $A_4$ | −0.002 | −0.00035 |
| Base surface radius R (mm) | 8.3 | 8.3 |

As one can see, LSA within 1.5 to 6 mm diameters manifests negative sign for spherical Base surface of diffractive multifocal contact lens, practically zero aberration for prolate Base surface shape design of ellipsoidal configuration and variable LSA signs for bi-sign Base surface shape—positive for up to level designated by letter P and negative for the pupil range between P and N. The LSA has one sign for the lens radius of almost 3 mm as P level is fairly close to 1.5 mm distance indicating that the contribution of different signs LSA is primarily for dilated pupil above 3 mm. The Graphs are presented for up to 6 mm diameter which is most common range of pupil dilation for not elderly subjects who are the vast majority of contact lens wearers.

FIG. 6 demonstrates a bi-sign base surface profile 510 of the bi-sign multifocal diffractive contact lens corresponding to LSA graph 430 of FIG. 5. The central region of the bi-sign base surface for up to about 1.5 mm diameter is of spherical radius as per TABLE 1 which is more curved than the base surface of the power equivalent spherical base surface 500 in order to create small additional tear space between cornea and diffractive groove at the internal diameter of the diffractive zone 550. The diffractive zone 550 occupies annulus between about 1.5 and 5.5 mm diameters. In this example the base surface is on the back of the lens but it can be placed on the front as well if different diffraction grooves shapes are applied.

As an example, TABLE 2 below describes the lens with posterior placement of the non-prolate base surface responding to 430 of FIG. 5 together with the definition of the spherical base surface corresponding to 420 of FIG. 5 and prolate surface corresponding to 440 of FIG. 5. The Base surface within the diffraction zone if shows by line 540 with diffraction grooves 550 along this diffraction base.

TABLE 2

Contact lens configuration within 1.5 and 6.0 mm diameters

| Parameters | Spherical | Bi-Sign non-spherical | Prolate non-spherical |
|---|---|---|---|
| Front spherical vertex radius R (mm) | 8.57 | 8.57 | 8.57 |
| Base surface vertex radius $R_v$ (mm) | 8.6 | 8.73 | 8.6 |
| Conic Constant Q | | 0 | 0.9411 |
| $A_4$ | | 0.00022831062 | |
| $A_6$ | | 3.6747952e−005 | |
| $A_8$ | | −6.3792778e−006 | |
| $A_{10}$ | | 2.8143156e−007 | |

The distance from the lens center defined by letter P''' corresponds to level P of FIG. 5. The base surface shape from about 1.5 mm to the distance P''' is to create negative LSA shown on FIG. 5 and base surface shape from P''' to N''' is to form positive LSA as shown by the range from P to N on FIG. 5.

The diffractive surface is defined for all three types of designs within 1.5 and 5.5 mm diameters with light intensity control, also called apodization, defined by the transmittance coefficients for far and near foci. The height of the diffraction grooves 550 is determined by the transmittance function for near focus with larger height to direct larger portion of light toward near focus and smaller height to direct lesser portion to near focus. The transmittance can be defined by a general form:

$$T = T_0 \cdot (1 - T_1 \cdot r - T_2 \cdot r^2 - T_3 \cdot r^3 - T_4 \cdot r^4) \qquad \text{Eq. 2}$$

The coefficients for this particular example are provided by the TABLE 3.

TABLE 3

| Efficiency | Transmittance | | | | |
|---|---|---|---|---|---|
| | $T_0$ | $T_1$ | $T_2$ | $T_3$ | $T_4$ |
| Far focus | 1.854367 | 4.031884 | −5.14292 | 2.408882 | −0.38271 |
| Near focus | −1.19243 | 7.244324 | −9.12796 | 4.208609 | −0.65672 |

As it is shown on FIG. 6, the heights of the diffraction grooves reduce from the internal diameter of the zone at about 0.75 mm distance from the lens center to the distance indicating by letter T meaning that the portion of light directed to near focus is reduced up to this distance which is close to about 1.5 mm. The diffraction groove heights then start increase again to the second transmittance peak for near focus and then reduce towards the edge of the diffractive zone at 2.75 mm from the lens center. First internal transmittance peak for near is to optimize the performance at normal lighting condition where pupils are around 3 mm diameter and the second peak is introduced to optimize the performance at dilated pupils. The dual peak transmittance for near focus can be applied to intraocular lenses as well to independently optimize optical performance at photopic condition where pupil is around 3 mm and mesopic condition where the pupil may be about 5 to 6 mm.

Figure 7:
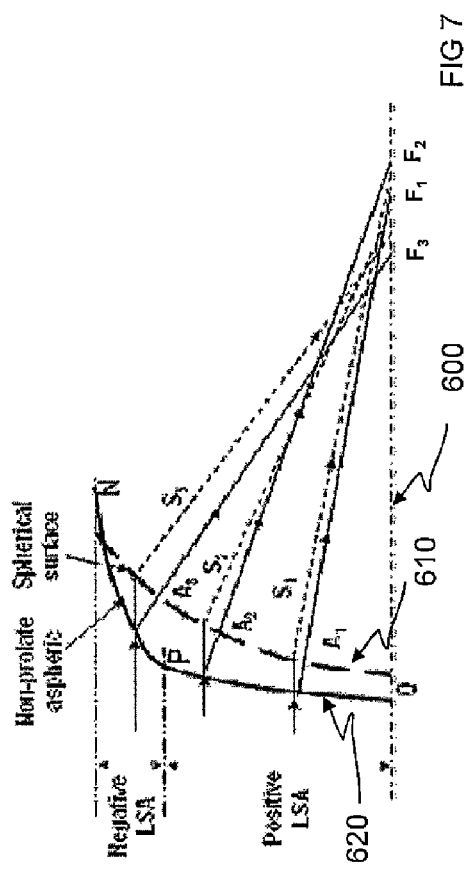
FIG. 7 illustrates longitudinal aberrations of spherical and bi-sign lenses and the corresponding surface profiles of the surfaces.

FIG. 7 demonstrates spherical 610 and bi-sign shape 620 surface profiles of an IOL in accordance with the present invention. More central ray $A_1$ focuses at $F_1$ at the optical axis 600. There are shown two regions though it could more regions producing different signs of longitudinal ray aberration. Central region of bi-sign aspheric surface from O to P creates positive longitudinal ray aberration. i.e. ray $A_2$ focused at $F_2$ which is farther away from $F_1$. The size of the central region is about the size of the photopic pupil of about 3 mm diameter. Peripheral region of bi-sign aspheric surface from P to N creates negative longitudinal ray aberration, i.e. ray $A_3$ focused at $F_3$ which is closer to the lens than the focus of the ray passing the surface at point P. The size of the peripheral regions is of annular shape between central region and about 5 mm diameter corresponding to mesopic pupil dimension. The best focus position 260' is defined at photopic condition and is close the middle of the longitudinal ray aberration range formed by the central region OP, i.e. somewhere between $F_1$ and $F_2$. At mesopic condition, both regions are exposed. In general, one of the regions, for instance peripheral region, may have zero longitudinal ray aberration to achieve at least some benefits over the prolate type aspherization.

In case of the positive spherical surface 610 of similar power, the focus $S_1$ starts farther away from the surface and becoming closer to the surface as rays move toward the surface periphery, $S_2$ and $S_3$.

Figure 8:
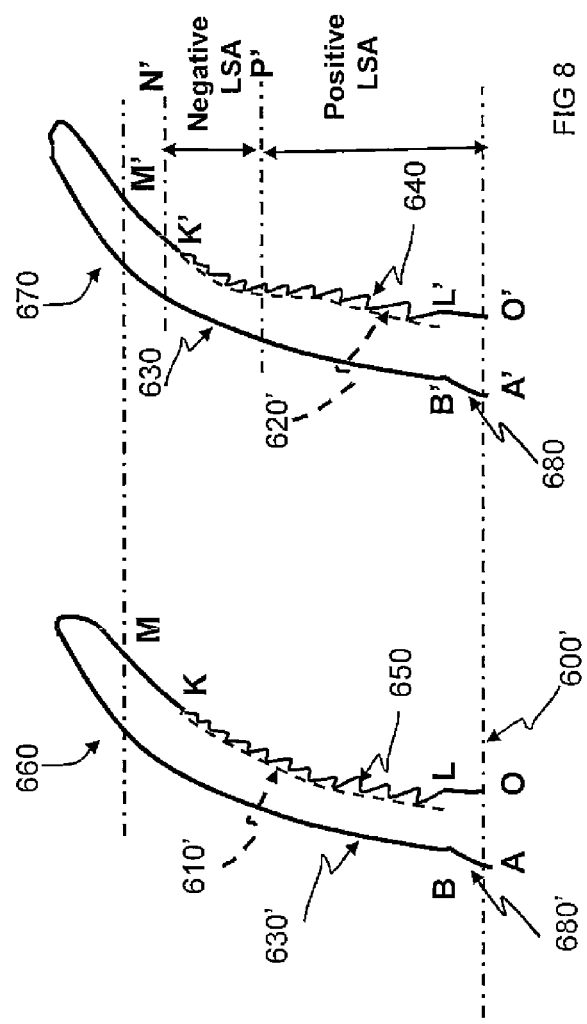
FIG. 8 demonstrates diffractive multifocal contact lens with spherical base surface and diffractive multifocal lens with bi-sign base surface.

FIG. 8 demonstrates diffractive multifocal contact lens 660 with spherical base surface having diffraction base 610' between LK and its spherical periphery KM and diffractive multifocal contact lens 670 with bi-sign base surface having diffraction base 620' between L'P' and its periphery K'M'. The optical axis is shown as 600'. For illustration purpose, spherical and bi-sign base surface are shaped to correspond to base surfaces on FIG. 6 where bi-sign and spherical surfaces were referenced to. The portion of base surface L'P' is shown as resulting with positive longitudinal spherical aberration and peripheral portion P'N' producing negative longitudinal spherical aberration. In general, it might be visa versa with internal portion of base surface producing negative LSA and peripheral portion producing positive LSA. In the example, the front surfaces 630' and 620' are of spherical shape from distance B and B' correspondently. The central portions 680 and 680' of the front surfaces are aspherized to increase the depth of focus around far to include intermediate foci. The resulted LSA is shown as 450 on FIG. 5. A similar results with bi-sign LSA can be achieved by reshaping the opposite refraction surface instead of the base surface that incorporates diffraction multifocal zone.

The diffractive zone may also occupy the annulus of the multifocal surface with small central refractive zone as shown in the above example or full base surface.

FIGS. 9A, 9B, 9C and 9D demonstrate graphs comparing Far vision Modulation Transfer Functions (MTFs) of the eye with spherical, prolate type and bi-sign shape base surfaces corresponding to LSAs shown on FIG. 5.

The Best Focus at each lens position was defined at 3 mm pupil corresponding to photopic condition and the Far MTFs were calculated at 6 mm pupil without adjusting the focus position. 6 mm pupil corresponds to mesopic condition. The Far MTF graphs at 6 mm pupil demonstrate that its drops significantly for the lens with spherical Base surface and it is the highest MTF for the lens with prolate shape Base surface lens optimized for 6 mm pupil at lens centered position. Both Far MTFs of spherical and prolate base surfaces drop significantly below Far MTF of the lens with bi-sign shape Base surface with lens shifting over the cornea within clinically common magnitude.

Incorporating bi-sign shape into monofocal contact lens design also provide the overall optical improvement over the spherical or prolate shape monofocal contact lenses but not as significant as with multifocal optic because monofocal optic manifests high optical quality to start with. Improvement in optical quality of multifocal lenses is manifested to a larger degree because the MTF is already reduced by the presence of out of focus image and improvement in image quality by bi-sign shape is highly important. The bi-sign shape allows to maintain high optical quality of far vision within the common range of lens movement over the cornea.

Although there has been hereinabove described a specific bi-sign contact lens in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

What is claimed is:

1. A diffractive multifocal optic of a contact lens comprising:
   a front and a back surface, one of the front and back surfaces being a refractive surface and another of the front and back surfaces being a diffractive multifocal surface; and
   at least one of the refractive surface and a base surface of the diffractive multifocal surface comprising bi-sign shape non-spherical surface with at least two largely annular regions within one optical zone, one of the two region being configured for producing a longitudinal ray aberration of a different sign from another of the two regions.

2. The optic according to claim 1 wherein the bi-sign shape non-spherical surface extends from near an optical axis of the lens to create positive longitudinal ray aberration at the central region and a second region of the bi-sign shape surface to creates negative longitudinal ray aberration at the lens peripheral region of the contact lens optical zone.

3. The optic according to claim 1 wherein the bi-sign shape non-spherical surface extends from near an optical axis of the lens to create negative longitudinal ray aberration at the central region and a second region of the bi-sign shape surface to creates positive longitudinal ray aberration at the lens periphery of the contact lens optical zone.

4. The optic according to claim 1 wherein said contact lens comprises a soft contact lens material.

5. The optic according to claim 1 wherein said contact lens comprises a hard contact lens material.

6. The optic according to claim 2 wherein the central region occupies about 3 mm diameter of the optical zone.

7. The optic according to claim 3 wherein the central region occupies about 3 mm diameter of the optical zone.

* * * * *